Figure 1:
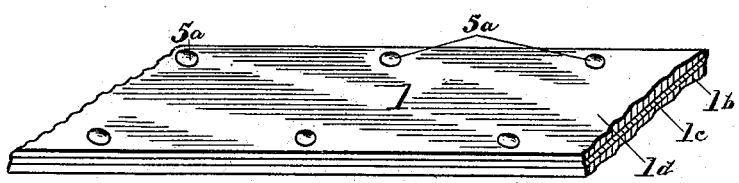

(No Model.)

E. TODD.
BELTING.

No. 492,880. Patented Mar. 7, 1893.

Witnesses.
C. L. Lawrie
M. E. Lindop

Inventor:
E. Todd
by C. H. Rieles
his attorney

United States Patent Office.

ELDORAS TODD, OF CLAVERING, CANADA.

BELTING.

SPECIFICATION forming part of Letters Patent No. 492,880, dated March 7, 1893.

Application filed August 15, 1892. Serial No. 443,100. (No model.)

*To all whom it may concern:*

Be it known that I, ELDORAS TODD, lumberman, of the village of Clavering, in the county of Grey and Province of Ontario, Canada, have invented certain new and useful Improvements in Belting or Power-Transmitters; and I hereby declare the following to be a full, clear, and exact description of the same.

It is well known by those interested in leather belting that the middle portion of the hide has the least comparative stretch and textile strength, and that the edges of the hide have the greatest comparative stretch and textile strength, consequently a belt constructed from the middle portion and the two sides of the hide would be of unequal stretch and strength; it has also been found that one of these belts after being put to work proceeds very rapidly to stretch and that in the course of a few hours or a day or more becomes so slack that a large amount of the power is lost in transmission between the driving and the driven pulleys; it is also known that some portions of the hide will more readily crack or split than others and that if one of these portions is used in the manufacture of the belt it is more than possible that the destruction of the belt will rapidly follow, to say nothing of the loss of its elasticity on account of the employment of this rapidly destructible part. It has also been found that a leather belt when wet will stretch to such an extent that it will slip upon the pulley and fail to transmit any power whatever from the driving to the driven pulley. Again in regard to leather, rubber, and fabric belting it might be stated that these beltings are apt to run off the pulley and become wound upon the shaft or tangled in the spokes of the pulley and destroy themselves, while in the event of breakage they have been known to whirl through the surrounding space and seriously injure any object with which they come in contact. These classes of belting are also destroyed by the friction caused by the continuous travel of the belting over the pulleys, and also by the action of fire; and the object of this invention is to devise a belt or power transmitter all portions of which will have an equal textile strength and the stretching properties of which will amount to *nil* when in comparison with the stretching of the leather, rubber or fabric belting and which can be so evenly constructed that no danger of running off the pulley, by reason of an uneven surface will ever occur, and consequently the accompanying destruction of being wound on the shaft or tangled in the pulley will be avoided, and which also in the event of breakage or any unforeseen or unavoidable cause will drop from the pulleys and remain motionless and thus prevent destruction or injury to life or property by being whirled through the atmosphere, and which will also resist the friction caused by its continuous travel over the pulleys and also the action of fire; the whole device being constructed and arranged as hereinafter more fully set forth.

Figure 2:
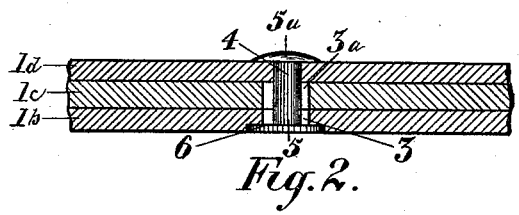

In the drawings:—Figure 1 is a perspective view of a portion of a three ply belt. Fig. 2 is a cross sectional view of the portion of the belt shown in Fig. 1.

Like numerals of reference refer to like parts throughout the specification and drawings.

The belt itself as shown in the drawings consists of three sheets of flexible metal $1^b$, $1^c$, and $1^d$, arranged one above the other. In the lower strip $1^b$ and intermediate strip $1^c$ are formed a series of longitudinal slots respectively 3 and $3^a$ suitably spaced. The slots in the sheet $1^c$ are arranged vertically over the slots in the sheet $1^b$ and through these slots passes the stem 4 of a rivet, the enlarged head 5 of which entirely enters a counter sunk hole 6 formed in the lowermost or inner ply $1^b$ and is flush with the lower or pulley surface of the same while the opposite end $5^a$ of the stem 4 is firmly secured to the outer most ply $1^c$. The object of this arrangement of slots and rivets is to allow of any necessary play on the part of the plies $1^b$, $1^c$, $1^d$.

Having thus fully described my invention, what I claim as new, and desire to secure by Letters Patent, is—

A power transmitter consisting of a metallic belt comprising a multiple number of metallic sheets arranged one above the other, a series of slots formed in the lower most and intermediate sheets, rivets passing through said slots, each of said rivets having an enlarged head to enter a counter sunk hole in
5 the lower most sheet, the opposite end of the said rivet secured to the upper most sheet, the opposite meeting ends of each sheet fastened together to form a continuous belt, substantially as described.

Toronto, July 20, 1892.

ELDORAS TODD.

In presence of—
CHARLES H. RICHES,
M. E. ANGELL.